United States Patent Office 3,129,255
Patented Apr. 14, 1964

3,129,255
ALKYLATION OF BENZENE WITH PROPYLENE IN THE PRESENCE OF TiCl₄ AND ALKYL ALUMINUM SESQUICHLORIDE
Russell G. Hay, Gibsonia, Leo F. Meyer, Pittsburgh, and Charles M. Selwitz, Pitcairn, Pa., assignors to Gulf Research & Development Company, Pittsburgh, Pa., a corporation of Delaware
No Drawing. Filed Dec. 1, 1959, Ser. No. 856,349
4 Claims. (Cl. 260—671)

This invention relates to a process for preparing an alkyl aromatic.

Alkyl aromatics are prepared in accordance with the process of this invention by reacting an alkylatable aromatic hydrocarbon with an olefin in the presence of a catalyst mixture containing an organo aluminum halide and a heavy metal halide at a temperature of at least about 55° C. By operating in accordance with such process alkyl groups are obtained on the aromatic hydrocarbon having the same number of carbon atoms as the alkylating olefin.

Any alkylatable aromatic hydrocarbon can be employed in the reaction, whether it be solid or liquid, mononuclear, dinuclear or polynuclear, substituted or unsubstituted. Among the mononuclear alkylatable aromatic compounds which are preferred are benzene and substituted benzes containing as substituents from one to three alkyl radicals having from one to 20 carbon atoms, preferably from one to 10 carbon atoms. Among the dinuclear alkylatable aromatic compounds which are preferred are naphthalene and substituted naphthalenes containing as substituents from one to 4 alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzenes, n-octylbenzene, 2-phenyl-4-ethyloctadecane, naphthalene, isopropylnaphthalenes, diisopropylnaphthalenes, 1-ethyl-6-isobutylnaphthalene, 1,2,4 - triisopropylbenzene, phenanthrene, etc. In the event the alkylatable aromatic compound is normally liquid, no extraneous solvent need be employed in the reaction. With a normally solid alkylatable hydrocarbon an inert solvent such as heptane, normal octane, isooctane, etc., can be employed.

While olefins having from two carbon atoms and up to 30 carbon atoms can be employed in the alkylation reaction, olefins having from three to 20 carbon atoms are preferred. Examples of olefins which can be employed are ethylene, propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methylbutene-1, cis-pentene-2, transpentene-2, hexene-1, cis-hexene-2, trans-hexene-2, 5,6-dimethylheptene-1, tetrapropylene, pentadecene-1, 6-cyclohexyldodecene - 1, 4-n-nonyldodecene-1, n-tetracosene-1, n-heptacosene-1, 13-cyclopentylpentacosene, etc.

The amount of olefin which need be present at any moment during the reaction can be of course be small. While the total amount of olefin which will be required for the reaction can be added to the reaction zone initially with the alkylatable aromatic compound this is not preferred because of the tendency of some of the olefin to polymerize. Desirably a small amount of olefin is added to the reaction zone as the reaction progresses and until reaction ceases. The total amount of olefin consumed will of course vary with the alkylatable aromatic compound and olefin employed, the pressure, temperature, reaction time, catalysts, etc. In general the total amount of olefin can be at least about 0.2 mol, but preferably about one to about 4 mols, per mol of alkylatable aromatic compound.

The organo aluminum halide which forms one of the active agents in the catalyst system employed can be defined by the formula $R_aAlX_b$, wherein R can be an aromatic radical such as phenyl, tolyl, xylyl, etc.; or an alkyl group having from one to 10 carbon atoms, preferably from one to 4 carbon atoms, such as methyl, ethyl, propyl, isopropyl, isobutyl, normal butyl, etc.; X is a halogen atom selected from the group consisting of fluorine, chlorine, bromine and iodine; and $a$ and $b$ are values from one to two. Examples of organo aluminum halides which can be employed are ethylaluminum sesquichloride, methylaluminum sesquichloride, ethylaluminum sesquibromide, isobutylaluminum sesquichloride, diethylaluminum chloride, ethylaluminum sesquifluoride, n-butylaluminum dibromide, decylaluminum sesquichloride, methylaluminum sesquiiodide, etc.

The heavy metal halide which is employed in conjunction with the organo aluminum halide as the second active agent in the catalyst system is critical in order to obtain the desired alkylation reaction of this invention. The metallic portion thereof must be selected from group IVB of the periodic table, that is, titanium, zirconium and hafnium. Thus a titanium halide, such as titanium tetrachloride ($TiCl_4$), zirconium chloride ($ZrCl_4$) and hafnium chloride ($HfCl_4$) can be employed with the organo aluminum halide and excellent results will be obtained.

We have found that excellent results will be obtained by carrying out the alkylation reaction of this invention using the heavy metal halide and organo aluminum halide in a molar ratio of about one to one to about nine to one, preferably about three to one to about four to one. The total amount of catalyst employed is not critical, although the amount thereof has a pronounced affect on the extent of alkylation and the position assumed by the alkyl groups on the alkylatable aromatic compound. Thus the total amount of catalyst required must be at least about 0.1 millimol of catalyst per mol of alkylatable aromatic compound, preferably about one to about 10 millimols of catalyst per mol of alkylatable aromatic compound.

The reaction pressure is not critical and can be varied over a wide range. Since the catalyst is in the liquid phase, the alkylatable aromatic desirably is also in the liquid phase. In order, therefore, to contact the alkylatable aromatic at the high temperatures which have been found necessary for the alkylation reaction of this invention, elevated pressures are thus required. With higher boiling alkylatable aromatics, of course, lower pressures can be employed. Thus the pressure can be from about atmospheric to about 500 pounds per square inch gauge or higher.

The temperature required to obtain the alkyl aromatic in accordance with the process of this invention is critical. In the event a mononuclear aromatic compound, such as benzene or substituted benzene, is employed as charge the temperature must be at least about 55° C., preferably from about 100° to about 130° C. In some cases temperatures in excess of 130° C., for example up to about 220° C., can advantageously be employed. In the event a dinuclear or polynuclear compound such as naphthalene is employed as charge the temperature must be at least about 150° C., preferably about 190° to about 200° C.

Reaction time can be of short duration and can be controlled in any suitable manner. Since the reaction is exothermic, the temperature and contact time thereof can also be controlled by the rate of addition of olefin to the alkylatable aromatic compound. An additional advantage resulting from the addition of olefin to the alkylatable aromatic compound is that olefin polymerization is thereby inhibited. Thus a reaction time of at least about 5 minutes, preferably about one to about 4 hours is suitable.

After the desired reaction has been completed, the catalyst is deactivated and further reaction terminated in any convenient manner, for example, by hydrolyzing the same with a compound containing an active hydrogen such as water or methanol. The products can be recovered by the simple expedient of distillation.

The process can be further illustrated by reference to the following examples. In each of the examples whose data are tabulated below in Table I the alkylatable compound was benzene and the olefin propylene. In general 352 grams of benzene were placed in a flask having an inert atmosphere. The designated amount of catalyst was then added and the system pressured to about 150 pounds per square inch gauge with propylene. The reaction was permitted to proceed until the pressure was reduced to about 80 pounds per square inch gauge, at which point the system was again pressured with propylene to 150 pounds per square inch pressure. This procedure was repeated for the designated time. At the end of the reaction period the catalyst was deactivated by hydrolyzing the same with methanol and the individual components recovered by distillation.

a catalyst consisting of 1.11 millimols of ethyl aluminum sesquichloride per mol of toluene and 3.32 millimols of titanium tetrachloride per mol of toluene. The run was carried out over a period of 3 hours at a temperature of 140° C. and an initial pressure of 120 pounds per square inch gauge. 890 grams of product were recovered, of which 90 percent by weight was triisopropyltoluene, 7 percent diisopropyltoluene, 2 percent cymene and one percent toluene.

*Example 20*

Naphthalene was also alkylated in accordance with the process of this invention. Thus one mol of naphthalene was placed in an autoclave having an inert atmosphere. 280 cubic centimeters of heptane were then added to the autoclave, followed by the addition of 0.80 cc. of ethyl aluminum sesquichloride and 3.28 cc. of titanium tetrachloride. The autoclave was then heated to 80° C. while stirring and propylene pressured in until a pressure of 120 pounds per square inch gauge was attained. Heating was continued but no reaction occurred until the temperature was raised to 160° C. The temperature was increased to a maximum of 210° C. As the pressure decreased below 120 pounds per square inch

TABLE I

| Example | Catalysts, Millimols per Mol of Benzene | | Reaction Time hrs. | Temp., °C. | Gms. Prod. Including Unreacted Benzene | Percent by Weight in Product of— | | | | | | |
|---|---|---|---|---|---|---|---|---|---|---|---|---|
| | | | | | | 1,2,4,5-tetraisopropylbenzene | 1,3,5-triisopropylbenzene | 1,2,4-triisopropylbenzene | Cumene | Diisopropylbenzene | Benzene | Polymer |
| 1 | 0.735 MASC | 1.48 TiCl₄ | 4 | 44 | 420 | 0 | 0 | 0 | 2 | 0 | 82 | 16 |
| 2 | 0.735 MASC | 1.48 ZrCl₄ | 4 | 42 | 494 | 2 | 1.0 | 1.0 | 4 | 2 | 67 | 23 |
| 3 | 1.11 MASC | 1.11 TiCl₄ | 4 | 130 | 800 | 12 | 6 | 15 | 24 | 23 | 19 | 3 |
| 4 | 0.735 MASC | 1.48 TiCl₄ | 4 | 130 | 850 | 35 | 16 | 12 | 5 | 10 | 22 | 2 |
| 5 | 0.222 MASC | 1.994 TiCl₄ | 4 | 120 | 570 | 10 | 6 | 25 | 20 | 25 | 6 | 8 |
| 6 | 0.553 MASC | 1.66 TiCl₄ | 4 | 60-70 | 620 | 1.0 | 1.0 | 6 | 15 | 7 | 40 | 29 |
| 7 | 1.11 EASC | 3.32 TiCl₄ | 2 | 82 | 668 | 6 | 4 | 6 | 28 | 10 | 23 | 23 |
| 8 | 0.553 MASC | 1.66 TiCl₄ | 4 | 120 | 926 | 50 | 33 | 2 | 0 | 0 | 0 | 15 |
| 9 | 0.553 EASC | 1.66 TiCl₄ | 4 | 125 | 1,160 | 60 | 25 | 0 | 0 | 4 | 2 | 0 |
| 10 | 0.553 MASC | 1.66 TiCl₄ | 4 | 130 | 940 | 40 | 20 | 20 | 8 | 11 | 5 | 2 |
| 11 | 0.553 EASC | 1.66 TiCl₄ | 1 | 130 | 1,099 | 50 | 40 | 1.0 | 2 | 2 | 1.0 | 4 |
| 12 | 0.553 EASC | 1.66 TiCl₄ | 2½ | 125 | 963 | 41 | 25 | 11 | 3 | 5 | 2 | 14 |
| 13 | 1.11 EASC | 3.32 TiCl₄ | 2½ | 130 | 1,100 | 30 | 42 | 0 | 0 | 5 | 2 | 21 |
| 14 | 0.553 IBASC | 1.66 TiCl₄ | 2½ | 205 | 860 | 22 | 31 | 18 | 7 | 21 | 1.0 | 0 |
| 15 | 0.553 EASC | 1.66 ZrCl₄ | 4 | 130 | 1,050 | 43 | 36 | 0 | 0 | 0 | 0 | 20 |
| 16 | 0.553 EASC | 1.66 ZrAcA | 1 | 105 | 352 | 0 | 0 | 0 | 0 | 0 | 100 | 0 |
| 17 | 0.553 EASC | 1.66 Ti[OC₃H₇]₄ | 1 | 105 | 352 | 0 | 0 | 0 | 0 | 0 | 100 | 0 |

In Table I above MASC refers to methyl aluminum sesquichloride, EASC to ethyl aluminum sesquichloride, IBASC to isobutyl aluminum sesquichloride, ZrAcA to zirconium acetonyl acetonate and Ti[OC₃H₇]₄ to titanium tetraisopropoxide. It can be seen from the data in Table I that runs made at temperatures below 55° C. were ineffective for purposes of this invention and that the defined heavy metals must be employed in their halide form. It will be further noted that the alkylated product in each instance contained alkyl groups having the same number of carbon atoms as the alkylating olefin.

*Example 18*

A reaction was carried out similar to that set forth above except that ethylene was employed as the alkylating olefin. 300 grams of benzene, 0.553 millimol of ethyl aluminum sesquichloride per mol of benzene and 1.66 millimols of titanium tetrachloride per mol of benzene were employed, the reaction time was 4 hours, the temperature 110° C. and the initial pressure 120 pounds per square inch gauge. 355 grams of product were obtained, of which 28 grams were diethylbenzene, 11 grams triethylbenzene, 14 grams tetraethyl benzene, 13 grams pentaethylbenzene, 27 grams polymer and 240 grams unreacted benzene.

*Example 19*

An additional reaction was carried out similar to Example 18. Toluene was employed as the alkylatable aromatic compound, propylene as the reactant olefin and gauge more propylene was charged to the autoclave. After a period of 4 hours the temperature dropped to 100° C., after which the autoclave was cooled and degassed. The liquid product was filtered to remove catalyst residue and passed through a column of alumina to remove high molecular weight polymer oils. Evaporation of the heptane solvent left behind a yellow pasty residue containing 1,3,5,7-tetraisopropylnaphthalene as well as some polymer oil. A yield of about 50 percent by weight, based on the naphthalene charge, of the 1,3,5,7-tetraisopropylnaphthalene was recovered from this product by recrystallization using a methanol acetone solvent mixture. The 1,3,5,7-tetraisopropylnaphthalene, which is a new compound, can be employed as a high-pressure lubricant, fluorescing agent, etc. The other compounds obtained can similarly be employed.

Obviously, many modifications and variations of the invention, as hereinabove set forth, can be made without departing from the spirit and scope thereof, and therefore only such limitations should be imposed as are indicated in the appended claims.

We claim:

1. A process for alkylating benzene which comprises reacting benzene with propylene in the presence of a catalyst system consisting essentially of TiCl₄ and an alkyl aluminum sesquichloride wherein the alkyl substituent has from one to four carbon atoms at a temperature of at least about 55° C., the total amount of catalyst employed being at least about 0.1 millimol of catalyst per mol of said benzene, with said $TiCl_4$ and said alkyl aluminum sesquichloride being present in a molar ratio of about 1:1 to about 9:1.

2. A process for alkylating benzene which comprises reacting benzene with propylene in the presence of a catalyst system consisting essentially of $TiCl_4$ and methyl aluminum sesquichloride at a temperature of at least about 55° C., the total amount of catalyst employed being at least about 0.1 millimol of catalyst per mol of said benzene, with said $TiCl_4$ and said methyl aluminum sesquichloride being present in a molar ratio of about 1:1 to about 9:1.

3. A process for alkylating benzene which comprises reacting benzene with propylene in the presence of a catalyst system consisting essentially of $TiCl_4$ and ethyl aluminum sesquichloride at a temperature of at least about 55° C., the total amount of catalyst employed being at least about 0.1 millimol of catalyst per mol of said benzene, with said $TiCl_4$ and said ethyl aluminum sesquichloride being present in a molar ratio of about 1:1 to about 9:1.

4. A process for alkylating benzene which comprises reacting benzene with propylene in the presence of a catalyst system consisting essentially of $TiCl_4$ and isobutyl aluminum sesquichloride at a temperature of at least about 55° C., the total amount of catalyst employed being at least about 0.1 millimol of catalyst per mol of said benzene, with said $TiCl_4$ and said isobutyl aluminum sesquichloride being present in a molar ratio of about 1:1 to about 9:1.

References Cited in the file of this patent

UNITED STATES PATENTS

| | | |
|---|---|---|
| 2,824,145 | McCall et al. | Feb. 18, 1958 |
| 2,935,542 | Minckler et al. | May 3, 1960 |
| 2,949,492 | Weaver | Aug. 16, 1960 |
| 3,031,514 | Kosmin | Apr. 24, 1962 |

FOREIGN PATENTS

| | | |
|---|---|---|
| 526,101 | Italy | May 14, 1955 |
| 543,259 | Belgium | May 30, 1956 |
| 785,314 | Great Britain | Oct. 23, 1957 |

OTHER REFERENCES

Grosse et al.: J. Org. Chem. 1, 559–66 (1937).

Calcott et al.: J. Am. Chem. Soc., 61, 1010–1015 (1939), p. 1012 relied on.

UNITED STATES PATENT OFFICE
CERTIFICATE OF CORRECTION

Patent No. 3,129,255                      April 14, 1964

Russell G. Hay et al.

It is hereby certified that error appears in the above numbered patent requiring correction and that the said Letters Patent should read as corrected below.

Column 1, line 27, for "benzes" read -- benzenes --; line 58, strike out "be", first occurrence; columns 3 and 4, TABLE I, under the heading "Polymer", opposite "Example 9", for "0" read -- 4 --, opposite "Example 10", for "2" read -- 0 --, and opposite "Example 11", for "4" read -- 2 --.

Signed and sealed this 24th day of November 1964.

(SEAL)
Attest:

ERNEST W. SWIDER
Attesting Officer

EDWARD J. BRENNER
Commissioner of Patents